June 23, 1970 R. V. DAVIDGE ET AL 3,516,528

CHARACTER SELECTOR

Filed Jan. 16, 1968 4 Sheets-Sheet 1

INVENTORS

RONALD V. DAVIDGE
DONALD L. GREER
RICHARD W. MC CORNACK
JEROME B. O'DANIEL

BY E. Ronald Coffman
ATTORNEY.

CASE I

8 UNIT SHIFT

− DISPLACEMENT +

| | -8 | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| 32a(+1) | 0 | 1 | 0 | 1 | 0 | 1 | 0 | 1 | 0 | 1 | 0 | 1 | 0 | 1 | 0 | 1 |
| 33b(+2) | 0 | 0 | 1 | 1 | 0 | 0 | 1 | 1 | 0 | 0 | 1 | 1 | 0 | 0 | 1 | 1 |
| 34c(+4) | 0 | 0 | 0 | 0 | 1 | 1 | 1 | 1 | 0 | 0 | 0 | 0 | 1 | 1 | 1 | 1 |
| 35d(-8) | 1 | 1 | 1 | 1 | 1 | 1 | 1 | 1 | 0 | 0 | 0 | 0 | 0 | 0 | 0 | 0 |

| | | | | | | | | | | | | | | | | | | | | | | | |
|---|---|---|---|---|---|---|---|---|---|---|---|---|---|---|---|---|---|---|---|---|---|---|---|
| $a_8$ | $a_7$ | $a_6$ | $a_5$ | $a_4$ | $a_3$ | $a_2$ | $a_1$ | $b_8$ | $b_7$ | $b_6$ | $b_5$ | $b_4$ | $b_3$ | $b_2$ | $b_1$ | $c_8$ | $c_7$ | $c_6$ | $c_5$ | $c_4$ | $c_3$ | $c_2$ | $c_1$ |

CASE II

| | | | | | | | | | | | | | | | | |
|---|---|---|---|---|---|---|---|---|---|---|---|---|---|---|---|---|
| 32a(+1) | 0 | 1 | 0 | 1 | 0 | 1 | 0 | 1 | 0 | 1 | 0 | 1 | 0 | 1 | 0 | 1 |
| 33b(+2) | 0 | 0 | 1 | 1 | 0 | 0 | 1 | 1 | 0 | 0 | 1 | 1 | 0 | 0 | 1 | 1 |
| 34c(+4) | 0 | 0 | 0 | 0 | 1 | 1 | 1 | 1 | 0 | 0 | 0 | 0 | 1 | 1 | 1 | 1 |
| 35d(-8) | 1 | 1 | 1 | 1 | 1 | 1 | 1 | 1 | 0 | 0 | 0 | 0 | 0 | 0 | 0 | 0 |
| | -8 | -7 | -6 | -5 | -4 | -3 | -2 | -1 | 0 | 1 | 2 | 3 | 4 | 5 | 6 | 7 |

CHARACTER SELECTOR
FIG. 6
← − DISPLACEMENT + →
14 UNIT SHIFT
CASE I
| | -8 | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| 32a' (+1) | 0 | 1 | 0 | 1 | 0 | 1 | 0 | 1 | 0 | 1 | 0 | 1 | 0 | 1 | 0 | 1 |
| 33a' (+2) | 0 | 0 | 1 | 1 | 0 | 0 | 1 | 1 | 0 | 0 | 1 | 1 | 0 | 0 | 1 | 1 |
| 34a' (+4) | 0 | 0 | 0 | 0 | 1 | 1 | 1 | 1 | 0 | 0 | 0 | 0 | 1 | 1 | 1 | 1 |
| 35a' (−8) | 1 | 1 | 1 | 1 | 1 | 1 | 1 | 1 | 0 | 0 | 0 | 0 | 0 | 0 | 0 | 0 |
| | $d_{14}$ | $d_{13}$ | $d_{12}$ | $d_{11}$ | $d_{10}$ | $d_9$ | $d_8$ | $d_7$ | $d_6$ | $d_5$ | $d_4$ | $d_3$ | $d_2$ | $d_1$ | $e_2$ | $e_1$ |
CASE II
| | $e_2$ | $e_1$ | $f_{14}$ | $f_{13}$ | $f_{12}$ | $f_{11}$ | $f_{10}$ | $f_9$ | $f_8$ | $f_7$ | $f_6$ | $f_5$ | $f_4$ | $f_3$ | $f_2$ | $f_1$ |
|---|---|---|---|---|---|---|---|---|---|---|---|---|---|---|---|---|
| 32a' (+1) | 0 | 1 | 0 | 1 | 0 | 1 | 0 | 1 | 0 | 1 | 0 | 1 | 0 | 1 | 0 | 1 |
| 33a' (+2) | 0 | 0 | 1 | 1 | 0 | 0 | 1 | 1 | 0 | 0 | 1 | 1 | 0 | 0 | 1 | 1 |
| 34a' (+4) | 0 | 0 | 0 | 0 | 1 | 1 | 1 | 1 | 0 | 0 | 0 | 0 | 1 | 1 | 1 | 1 |
| 35a' (−8) | 1 | 1 | 1 | 1 | 1 | 1 | 1 | 1 | 0 | 0 | 0 | 0 | 0 | 0 | 0 | 0 |
| | -8 | -7 | -6 | -5 | -4 | -3 | -2 | -1 | 0 | 1 | 2 | 3 | 4 | 5 | 6 | 7 |
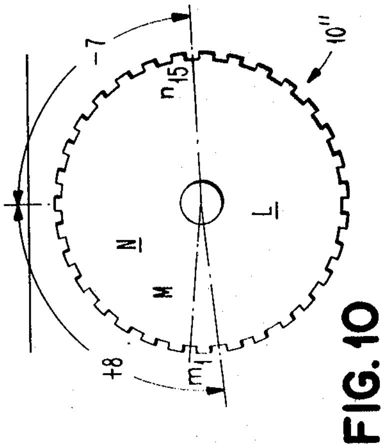
FIG. 10
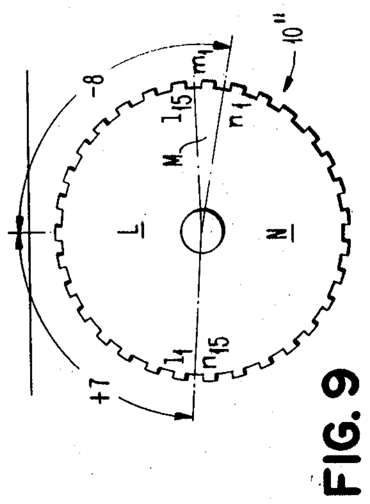
FIG. 9
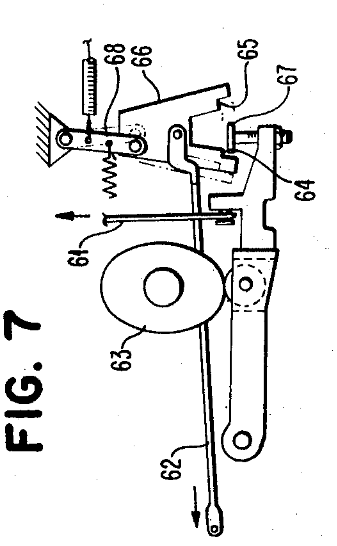
FIG. 7

United States Patent Office 3,516,528
Patented June 23, 1970

3,516,528
CHARACTER SELECTOR

Ronald V. Davidge, Donald L. Greer, Richard W. McCormack, and Jerome B. O'Daniel, Lexington, Ky., assignors to International Business Machines Corporation, Armonk, N.Y., a corporation of New York Filed Jan. 16, 1968, Ser. No. 698,295
Int. Cl. B41j 7/34
U.S. Cl. 197—16 6 Claims

ABSTRACT OF THE DISCLOSURE

A selector for positioning a character matrix and including a case shift selecting mechanism is provided with inverting control logic by which certain predetermined characters are selectable directly when the character matrix is in either case. Such predetermined characters are more rapidly selected by eliminating the need for intermediate shift operations. Also, direct selection of predetermined characters further permits accommodation of conventions requiring characters to be selectable in either case, such as the typewriter period and comma keyboard convention.

DISCLOSURE OF THE INVENTION

Character matrix printers such as that disclosed in U.S. Pat. No. 2,919,002, issued to L. E. Palmer, Dec. 29, 1959, and entitled "Selection Mechanism for a Single Printing Element Typewriter," employ a permutative-digital-input, analog-output device for selecting individual characters on the matrix for printing. Where a relatively large number of characters are available for selection, an independent positioning device is often provided for shifting the character matrix from a first range of characters to a second range of characters. Printers of this type require a determination first of which zone or case contains the desired character, and second, where in that zone is the desired character. If the printer is operated from a keyboard, as in the case of an office typewriter, the zone selection is accomplished by manipulation of the "shift key." In a record operated printer, zone selection is accomplished by "shift" codes which precede individual character codes.

Experience shows that certain characters are selected more than others and, depending upon the nature of a printing job, it is often desirable to eliminate the zone change or shift operation due to the frequency of character use. An example is found in the office typewriter where the period and comma are selectable either in upper or lower case. Accordingly, it is never necessary to manipulate a typewriter shift key to print a period or a comma. In the typewriter described in the aforesaid U.S. Pat. 2,919,002, this degree of keyboard versatility is accomplished by duplicating the period and comma masters on the character matrix in both the upper and lower case range. It will be recognized that a spherical character matrix of the aforesaid character geometrically limited number of available character masters and that the redundant period and comma could be eliminated for the substitution of two additional characters or the provision of larger characters but for the need to print these characters from both cases.

Another example can be taken from the data processing art wherein a large percentage of print requirements includes numbers and certain symbols which are intermixed with upper and lower case letter characters. If the numbers are printable exclusively from a single case, as is presently conventional, printing of such intermixed characters must inherently be accompanied by a large number of interspersed shift operations. These shift operations can be significantly reduced by making the number characters selectable directly from either case or range. Obviously, this general result coult be obtained by duplicating the number masters in both cases at the price of a reduced character set. Data processing requirements, however, do not generally lend themselves to a reduced character set but in fact tend to push for an expanded character set.

We have conceived a shifting selection system wherein certain predeterimned characters are located in a region of overlap in the range of selection. Proper character selection is accomplished by translation involving an automatic inversion of some part or all of the control logic to the selector mechanism.

One structural approach to our invention can employ independent selection coding for upper and lower case characters through mechanism like that disclosed in U.S. Pat. 3,324,985, issued to L. E. Palmer, J. O. Schaefer and R. J. Young, June 13, 1967, and entitled, "Encoder." We prefer, however, to accomplish the results with a more subtle and less elaborate approach. We has discovered that some or all of the input or output of a selector device can be inverted to select certain special groups of characters sufficient to satisfy the need for overlap in most situations.

For example, a selection system like that of U.S. Pat. 2,919,002 having a range of rotational selection increments of +5 through 0 to −5 character units can overlap the characters at one or both ends of the selection range (+5 rotate and −5 rotate) by reducing the magnitude of the shift device by one or two units and inverting the output of the selector to convert all plus selections to minus selections and all minus selections to plus selections.

As another example, if a particular selector has an output range equal to the sum of all of its digital inputs, then the character matrix can be effectively divided into thirds wherein the matrix movement upon shift exactly equals the range of overlapped characters. Character selection is accomplished by inverting that portion of the input of the selector which is equal to the magnitude of the shift movement. Where a character selector operates upon a pure binary progression (i.e. $2^n$ wherein $n$ is selected from the series 0, 1, 2, 3, . . . $n$), overlap of 1, 2, 4 etc. characters can be accomplished by appropriate selection of a shift value causing the selection ranges to overlap and by inverting those binary inputs totalling to the shift value.

These and other objects, features and advantages will be apparent to those skilled in the art upon reading the following specific description of some illustrative embodiments of our invention wherein reference is made to the accompanying drawings, of which:

FIG. 6 is a tabular presentation of the two selection response functions of the translator shown in FIG. 5;

FIG. 7 is a partial elevational view of a mechanical logic inverter usable in a translator constructed in accordance with our invention;

FIGS. 9 and 10 are schematic plan views of a rotatable character matrix constructed for operation by the translator shown in FIG. 8 and illustrating the two primary positions thereof.

Figure 1:
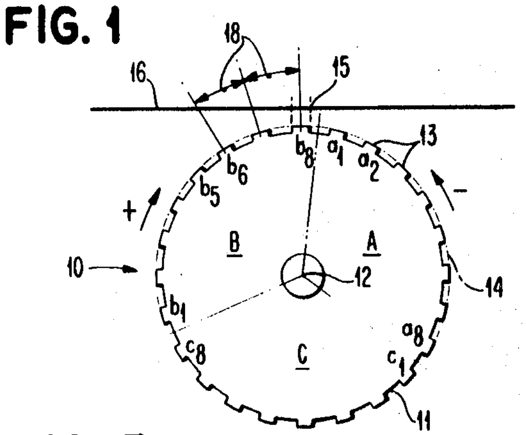
FIGS. 1 and 2 are schematic plan views of a rotatable character matrix constructed to present characters in accordance with one phase of our invention illustrating the two primary positions thereof.
Figure 2:
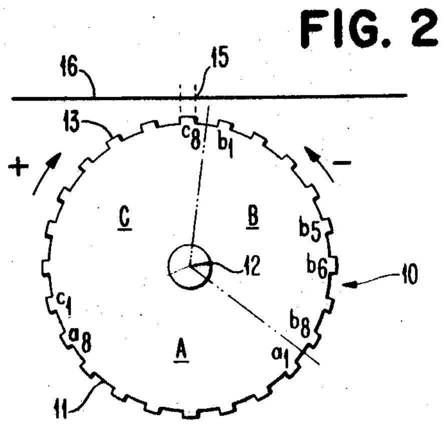
Figure 3:
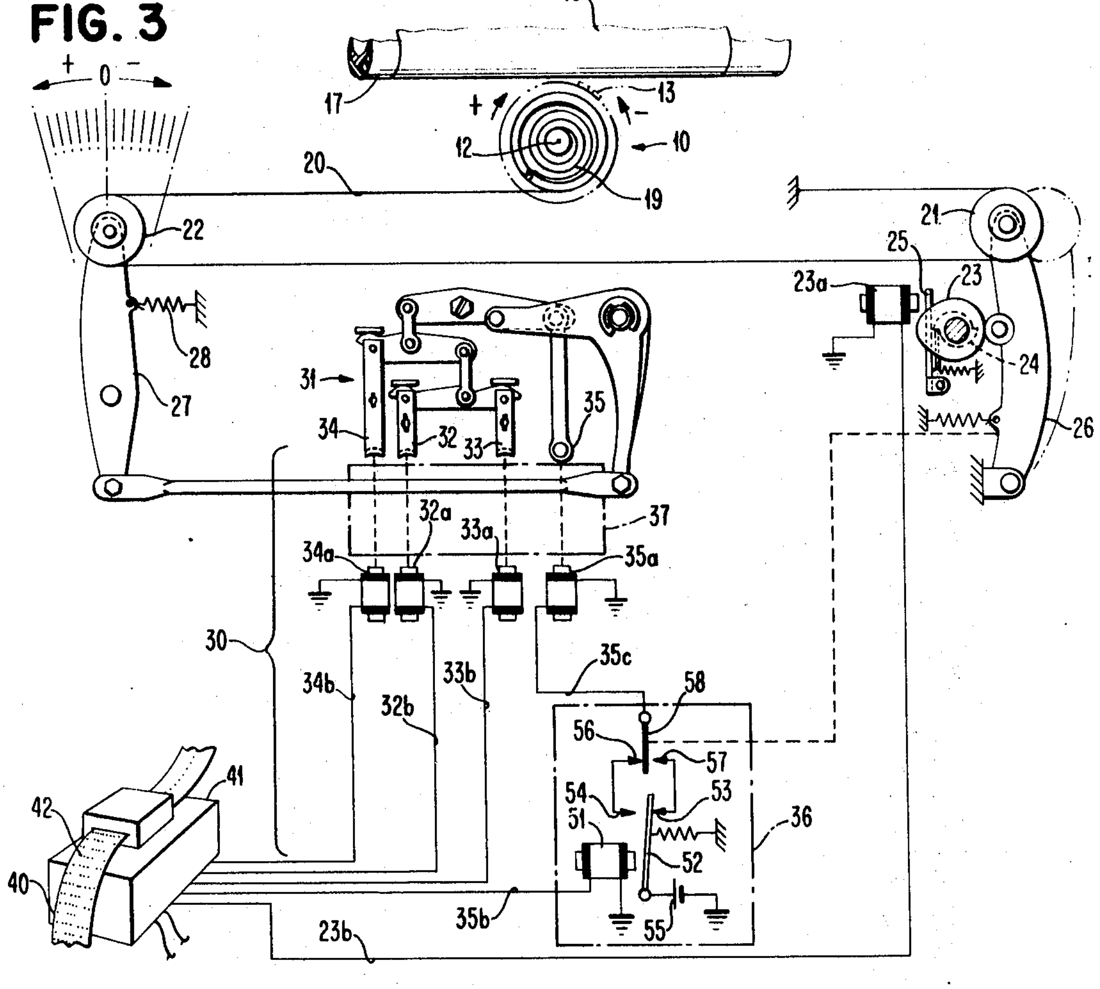
FIG. 3 is a schematic layout view of a translator including typical binary-input, analog-output selector of a type usable to selectively position the matrix of FIGS. 1 and 2 and including an inversion mechanism as required to obtain proper character selection.

FIGS. 1 through 3 schematically show a typewriter having a character matrix or carrier member 10 having a body 11 that is movable about a central axis 12 to select any one of twenty-four raised character masters or data bearing mens 13 by movement thereof along a path 14 to an aligned relationship with an output or operating station such as a printing position 15 adjacent paper or other media 16 supported on a platen 17 for printing cooperation therewith. A detailed description of a typewriter of this construction is set forth in aforesaid U.S. Pat. 2,919,002. The twenty-four character masters 13 are spaced apart at regular intervals 18 and are divided into three operatively distinct groups of eight character masters each labelled A, B, and C respectively. The individual character masters 13 are conveniently identified by a small letter *a*, *b*, or *c* corresponding to their group with a subscript 1 through 8 which increases in a clockwise direction.

As shown in FIG. 3, matrix 10 is rotated against clock spring 19 for selection of individual character masters 13 through displacement of tape 20 by shift or zone selection pulley 21 and by incremental selection pulley 22.

The shift pulley 21, when in its full line position shown in FIG. 3, positions the matrix 10 in its first or Case I primary position as shown in FIG. 1. A cam 23, operated by a two-position clutch 24, controlled by latch 25, can displace pulley 21 through a distance corresponding to the rotation of matrix 10 by an increment of eight intervals 18 through its pivoted support arm 26 to the broken line position shown in FIG. 3. When shift pulley 21 is in its broken line position, the matrix 10 is positioned in its second or Case II primary position as shown in FIG. 2.

The incremental selection pulley 22 is displaceable from its median position shown in FIG. 3 to any of fifteen other positions indicated by the broken lines and corresponding to positions of the matrix 10 as displaced from its primary position in either FIGS. 1 or 2 to present a specific character master 13 to output station 15.

Selective displacement of pulley 22 is achieved through its support arm 27 and bias spring 28 by a translator 30 including a digital-to-analog motion converter or selector 31 of the whiffle tree type disclosed in U.S. Pat. 2,919,002. The selector 31 includes dual position controllable input members 32, 33, 34 and 35 which respectively contribute output motion to pulley 22 of +1, +2, +4, and −8 angular increments. It will be observed that these motion increments follow the binary progression $2^n$ wherein *n* is selected from the series 0, 1, 2, 3, . . . *n*. Thus, in FIG. 1, any character master 13 in either groups A or B can be selectively moved to the output position 15. When the matrix 10 is shifted to the position shown in FIG. 2, any of the character masters 13 falling in groups B or C can be selected for movement of the output position 15. Note that in FIG. 1 selection of a character master 13 from group B (e.g. $b_6$) requires clockwise or + movement of matrix 10, whereas in FIG. 2, selection of character master $b_6$ requires counterclockwise or − movement of the matrix 10. Note also that the number of units of movement of the matrix 10 to select $b_6$, for example, differs depending upon whether the matrix is positioned as shown in FIG. 1 or is positioned as shown in FIG. 2.

Control of input latches 32, 33, 34 and 35 and clutch 23 to achieve proper selection of all character masters 13, and particularly those in group B, is accomplished in response to individual character descriptive data from source 40 such as punched paper tape through electromagnets **32*a*, 33*a*, 34*a*, 35*a*, and 23*a* together with logic inverter 36. Data from tape 40 is converted into electrical signals on lines 32*b*, 33*b*, 34*b*, 35*b*, and 23*b* by a reader 41** like that fully described in U.S. Pat. 2,619,532, entitled "Tape Reader," issued Nov. 25, 1952, to E. O. Blodgett.

The electromagnets **32*a*, 33*a*, 34*a*, and 35*a* operate the selection latches 32, 33, 34, and 35 through interface connection 37 as fully disclosed in U.S. Pat. 3,391,774. Shift control electromagnet 23*a* operates clutch latch 25 either in response to a discrete "shift" code derived from the tape 40 or in response to automatic translation as described in U.S. Pat 3,261,445, entitled "Tape Controlled Typewriter," issued July 19, 1966, to J. E. Hickerson. The tape reader 41 places an electrical potential on a corresponding line or wire 32*b*, 33*b*, 34*b*, or 35*b* upon detecting a code hole 42 in a corresponding channel or longitudinal row of the paper tape 40. The presence of potential on line 32*b*, for example, indicates the presence of a corresponding code hole 42 and activates electromagnetic 32*a* to select latch 32 which produces +1 unit of output displacement of incremental selection pulley 22. Similarly, potential placed on lines 33*b* and 34*b* is conducted to electromagnets 33*a* and 34*a* to cause activation thereof and corresponding selective positioning of the associated latches 33 and 34**.

Line **35*b* does not connect directly with electromagnet 35*a* but instead is connected to the logic inverter 36 which in turn is connected to electromagnet 35*a* through line 35*c*. The logic inverter 36 comprises an electromagnet 51 that operates upon the presence of potential on line 35*b* to attract an armature 52 breaking contact with switch element 53 and making contact with switch element 54. Accordingly, the presence of a hole 42 in the channel of tape 40 corresponding to electromagnet 35*a* will cause potential on line 35*b*, activation of magnet 51, transfer of armature 52 and the presence of potential from battery source 55 on output contact 56. Conversely, the absence of a hole will produce no transfer of armature 52 and thus will provide a potential from source 55 on output 57. Logic inverter 36 also includes a shift status switch arm 58 which is positioned to contact either output contact 56 or output contact 57 depending respectively on whether the shift pulley 21 is in its full or broken line position. It can thus be seen how logic inverter 36 of the translator 30 causes the translator to respond to the data from source 40** by either of two different functions as selected by the current shift status. In this example, the functions differ by 18 units of output motion produced from any given input code.

In operation, with shift pulley 21 in its full line position, the presence of a hole 42 in tape 40 corresponding to electromagnet **35*a* places potential on line 35*b* to transfer armature 52 and place potential on line 35*c* from battery 55 via contacts 54 and 56 to activate electromagnet 35*a*. If the hole were absent, electromagnet 35*a* would not have been activated. On the other hand, with shift pulley 21 in its broken line position, switch arm 58 is against contact 57. The presence of the same hole again activates electromagnet 51 to transfer armature 52, however, the circuit from battery 55 is now incomplete and electromagnet 35*a* remains inactive. Had the hole been absent, armature 52 would have remained in contact with switch element 53 to complete the circuit from battery 55 and activate electromagnet 35*a***.

Figures 4, 5:
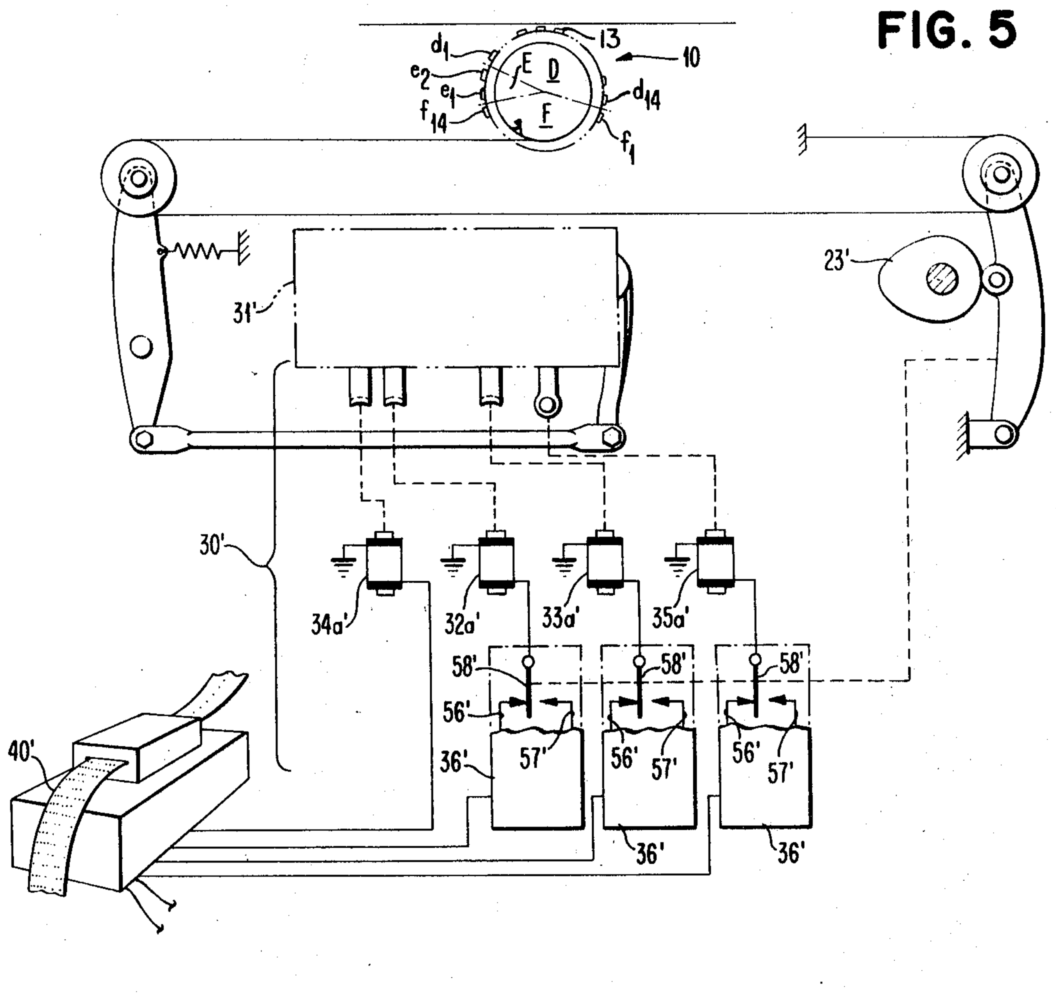
FIG. 4 is a tabular presentation of the two selection response functions of the translator shown in FIG. 3.
FIG. 5 is a schematic layout view of a translator similar to that of FIG. 3 but having a different range of overlap characters.

The effect of the selection control of translator 30 can be best understood by reference to FIG. 4 which presents the operations of selector 31 in the form of a dual function table showing angular unit displacement of the matrix 10 on the horizontal axis and operative control of the electromagnets **32*a*, 33*a*, 34*a*, and 35*a* along the vertical axis. The logical "1" denotes activation of the electromagnet and the logical "0" indicates inactivation. The table is presented in two major sections representative of the displacement or individual selection function for Case I as the matrix 10 is positioned in FIG. 1 and the displacement or individual selection function for Case II as the matrix 10 is positioned in FIG. 2. These two sections are connected by a middle section identifying the individual character masters 13 by their letter references. Note the characteristic overlap of all characters from section B which have selection tables in both Case I and Case II. Note also that the difference in operation of electromagnets 32*a*, 33*a*, 34*a*, and 35*a* for any character master $b_n$ between Case I and Case II is the inversion of the operative state of electromagnet 35*a*. In other words, to select any character $b_n$ with the matrix 10 in Case I, electromagnet 35*a* must be inactive, whereas, to select the same character $b_n$ with the matrix 10 in Case II, electromagnet 35*a* must be active. Similarly, characters in group A differ from characters in group C by the inversion of the operative effect of electromagnet 35*a***.

From FIG. 4 it can now be seen how the logic inverter 36 operates in the translator 30 to achieve direct selection of any character master in group B regardless of the shift state of the printer.

As a specific example, consider character master $b_5$ which, in Case I (FIG. 1), requires three units of clockwise (+) motion to reach output station 15. If a code on tape 40 representative of this character $b_5$ were 1, 1, 0, 0 wherein the "1" represents the presence of a hole 42 in the tape 40, and the "0" represents the absence thereof, the character $b_5$ would be selected by activation of electromagnets **32*a* and 33*a* which respectively contribute +1 and +2 increments to generate the required +3 displacement of the matrix 10. The same code 1, 1, 0, 0, if presented in the tape 40 at a time when the matrix 10 were in its Case II position, would select character $b_5$ by activation of electromagnets 32*a*, 33*a* and 35*a* since in Case II, the absence of a hole corresponding to electromagnet 35*a*** causes activation thereof. The matrix moves an increment of −5 due to the combination of +1, +2 and −8.

Characters in groups A and C are selectable only following an appropriate shift operation as by reading special shift codes to operate electromagnet **23*a*** as the punchings for characters in groups A and C will represent either of two characters depending upon the shift status of the printer at the time the punching is presented.

To further illustrate the breadth of our invention, there is shown in FIG. 5 a translator 30′ like that of FIG. 3, but modified to produce a 14-unit shift instead of the 8-unit shift of the translator 30 in FIG. 3. Corresponding reference numerals are employed for simplicity and distinguished from those of FIG. 3 by a prime (′) notation. This modification involves simply redesign of the shift cam 23′. The characters are divided into groups D, E, and F following the notation of FIGS. 1 and 2. The character layout is shown in the dual function table of FIG. 6 which is constructed like FIG. 4.

As the selector 31′ has a 16-unit capacity and the shift cam 23′ displaces the character matrix 10′ by only 14 units, there are only two character masters 13′ ($e_1$ and $e_2$) that are selectable in either case. By reference to FIG. 6, it will be seen that selection of characters $e_1$ and $e_2$, when the matrix 10′ is in Case I differs from the selection required in Case II by the inversion of the last three bits, i.e. operation of electromagnets **33*a*′, 34*a*′, and 35*a*′ and noninversion of the first bit, i.e. operation of electromagnet 32*a*′. Referring to FIG. 5, it will be seen that such inversion is accomplished by the provision of three logic inverters 36′ each internally constructed like inverter 36 shown in FIG. 3. The logic inverters 36′ each have a pair of output contacts 56′ and 57′ between which moves shift arms 58′ indicative of the current shift status of the printer. Accordingly, a code in data source tape 40′ that is appropriate to select character $e_2$ when the matrix 10′ is in Case I would have a hole in the channels corresponding to electromagnets 33*a*′ and 34*a*′ (0, 1, 1, 0). Shift arms 58′ are against contacts 56′ and the presence of holes delivers potential to the corresponding electromagnets. Energization of electromagnets 33*a*′ and 34*a*′ contribute incremental motion of +2 and +4 respectively to achieve the +6 total motion required to select character $e_2$. When matrix 10′ is in Case II, shift arms 58′ are transferred to their alternative positions against contacts 57′. In this mode, reading the same code (0, 1, 1, 0), causes no energization of electromagnets 33*a*′ and 34*a*′, but does cause energization of electromagnet 35*a*′** to generate the −8 motion required to select character $e_2$ in Case II.

It will be understood that any binary group of selections can be overlapped by inverting the bits representative of a cumulative magnitude equal to the shift increment employed in a full binary selection system. Accordingly, one character may be overlapped by inverting all sixteen units, four characters by inverting twelve units, and, as in the example of FIGS. 1 and 2, eight characters by inverting eight units.

Although the examples of FIGS. 1 through 6 show electrical mechanisms 36 and 36′ for inverting the control logic to the selection latches 32, 33, 34 and 35, this function can be performed mechanically as well. One appropriate mechanism is shown in FIG. 7. FIG. 7 shows a mechanical logic element having an output 61 that can be the control latch or element 35 of the selector shown in FIG. 3, and an input or control element 62 that can come from a mechanical encoding keyboard like that shown in aforesaid U.S. Pat. 2,919,002. The input 62 is operated selectively by movement to the left from its position as shown. Output link 61 will selectively move upwardly from its position shown upon appropriate control by input 62. As shown in FIG. 3, input 35 is normally biased for upward movement by spring 28. Returning to FIG. 7, it will be seen that such upward movement is prevented by cam 63 which rotates to permit upward movement once each print cycle. Upward movement is also prevented by either of two control surfaces 64 or 65 carried on a control latch or logic inverter 66 and selected by the position of input 62. When the parts are positioned as shown in full lines in FIG. 7, the absence of motion from input 62 causes surface 64 to inhibit upward motion of output link 61 by interposing the path of stop member 67. Rotation of cam 63 thus causes no output motion of member 61. On the other hand, displacement of input 62 to the left, moves surface 64 from the path of stop 67 and output 61 will be caused to move upwardly upon rotation of cam 63.

Note that control latch 66 is positioned to either of two basic positions by a shift position indicative arm 68. Upon a change in case status indicated by pivoting arm 68 counterclockwise and displacement of the parts shown to their broken line position, the absence of a pull to the left on input 62 will now produce an upward motion of output member 61 as the normal position of the ledges 64 and 65 are in a non-intercept relation to the stop 67. Similarly, a leftward pull on link 62 places ledge 65 in the path of stop 67 to prevent an upward output motion of member 61 in this shift mode. Accordingly, it will be seen that through the use of mechanical devices like that shown in FIG. 7, the input logic to a selector device such as that of FIG. 3 can be appropriately inverted to accommodate overlap of a plurality of characters.

Figure 8:
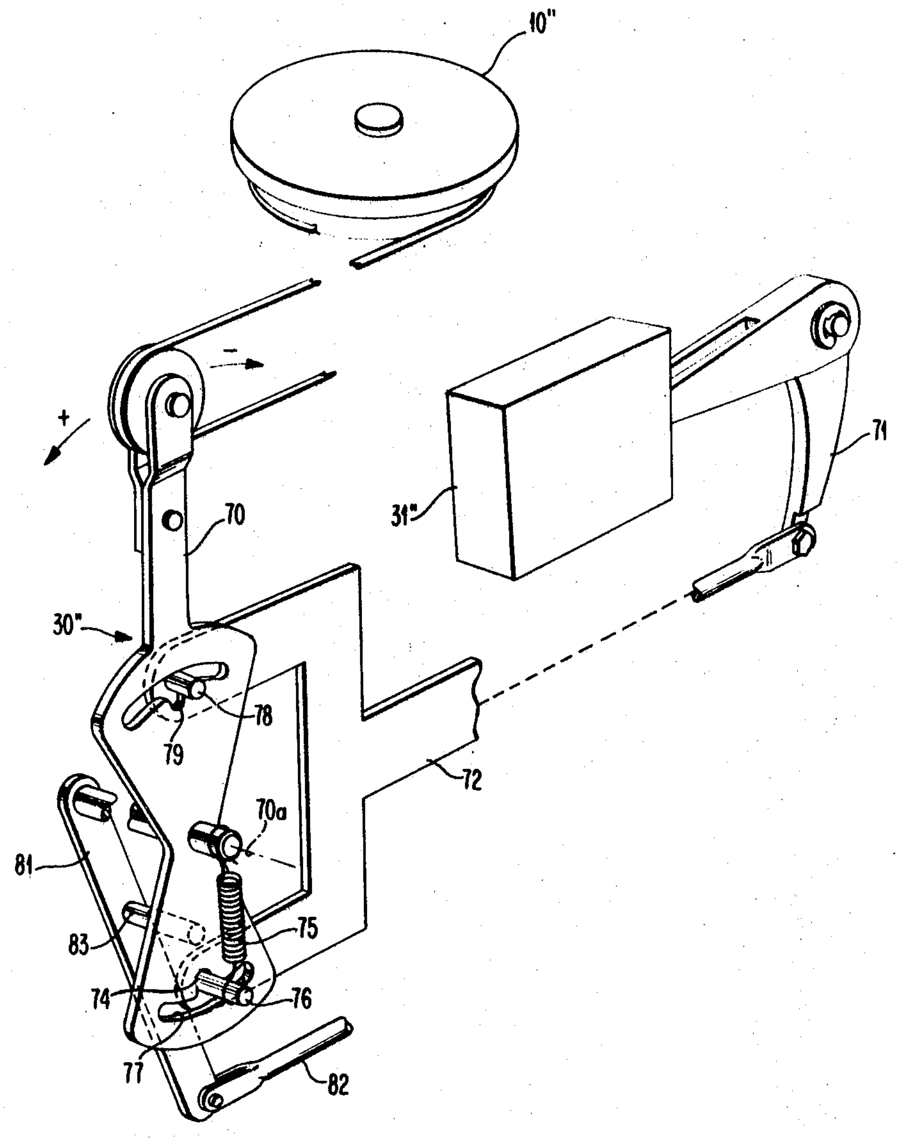
FIG. 8 is a partial perspective view of a different form of translator usable to implement the concepts of our invention.

Another application of our invention is shown in FIGS. 8–10 and employs a translator 30″ wherein output logic from a selector device 31″ is selectively inverted to produce two functions to enable overlap selection of a single character as an alternative to inversion of all input logic. FIG. 8 shows a modified control arm 70 for rotating a matrix 10″ upon input from a selector bellcrank 71. The selector 31″ is like selector 31 of FIG. 3 and has an output capability of +7 and −8 units of selection. With the mechanism positioned as shown in FIG. 8, counterclockwise motion of bellcrank 71 drives a transfer member 72 to the right to rotate arm 70 through pin 76 and notch 74 to produce up to +7 increments of motion at matrix 10″. Similarly, clockwise motion of bellcrank 71 moves transfer link 72 to the left to produce up to −8 increments of motion at matrix 10″. If it is desired to invert the output to obtain a one-character overlap, arm 81 is operated from the shift mechanism through link 82 to cause pin 83 to cam input link 72 downwardly against spring 75. This displacement aligns pin 76 with slot 77 in the link 70 and also aligns a pin 78 with a transverse notch 79 in the link 70. Now mechanical connection between link 72 and link 70 is above the link pivot axis 70*a* rather than below. The same rightward movement of transfer arm 72 which previously produced counterclockwise or + motion of the link 70 will now produce up to −7 units of clockwise or minus motion of the link 70. Likewise, leftward movement of transfer arm 72 will now produce up to +8 units of counterclockwise or + motion of the link 70. Accordingly, if sixteen characters are selectable by the selector mechanism and if a shift of fifteen units is employed between cases, the one character which exists in both cases may be selected by equating −8 selection in one case with +8 in the other case. This can be better understood by reference to the schematic showing of the character matrix 10″ in FIGS. 9 and 10.

In FIG. 9, the character matrix 10″ presents all of characters $\mathbf{1}_1$ through $\mathbf{1}_{15}$ for selection together with character $m_1$ which is positioned at the extreme limit of movement, i.e. at the −8 displacement. A fifteen-unit clockwise shift will move the matrix 10″ to the position shown in FIG. 10 wherein the character $m_1$ occupies the space previously occupied by character $n_{15}$. Character $m_1$ now is selectable by a +8 displacement of the matrix 10″ which, as described above, is produced by the inversion of the output logic through the link 70.

Those skilled in the art will recognize that we have discovered a new dimension in multi-position selecting devices by which the overall versatility and utility of a device can be increased by retaining a shift operation to obtain an expanded character set while at the same time effectively eliminating the shift operation for a group of high utilization characters. While several different approaches have been employed in the description of our broader concepts, it will be understood that our invention is limited only as specifically set forth in the appended claims.

We claim:

1. A carrier movable along a predetermined path, a plurality of data bearing means positioned on said carrier at regular intervals along said path, and means defining an operating station adjacent said carrier for cooperating with any one of said data bearing means when brought into a predetermined operative relationship therewith by movement of said carrier along said path, wherein the improvement comprises selective positioning means for moving said carrier along said path to place any one of said data bearing means in said predetermined operative relationship with said operating station and having:

zone selection means for moving said carrier along said path to either of a pair of primary positions separated by a predetermined number of said intervals; and individual selection means for further moving said carrier along said path varied numbers of said intervals from either one or the other of said primary positions and within either a first or a second predetermined range respectively, the sum of the number of intervals within said first range and the number of intervals within said second range exceeding the total number of intervals on said carrier so that said ranges overlap and encompass at least one data bearing means common to both ranges, said common data bearing means being directly selectable by said individual selecting means when carrier is in either one of said primary positions.

2. Mechanism as defined in claim 1 wherein said individual selection means receives selection data descriptive of individual data bearing means from a source, said individual selection means having translation means, said translation means being responsive to data from said source to translate said data in accordance with either of two different predetermined functions, and means responsive to the current status of said zone selection means for selecting a respective one of said two predetermined functions.

3. Mechanism as defined in claim 2 wherein said translator means comprises a digital-to-analog converter having a plurality of independently selectable dual position input members and a multiposition output member, means interconnecting said input members with said output member for generating different degrees of motion thereof, means for selectively positioning said input members, and at least one logical inverter operatively connected between one of said input members and said data source and responsive to the current zone selection of said carrier for inverting at least a portion of the response of said input members to data from said source depending upon said zone selection.

4. Mechanism as defined in claim 2 wherein said translation means comprises:

a digital-to-analog converter having a plurality of selectable inputs each representative of a directional incremental component of output motion of an amount selected in accordance with the pure binary progression $2^n$ wherein $n$ is selected from the series 0, 1, 2, 3, . . . $n$, each combination of selected input being representative of a different position of said carrier within either said first or said second predetermined range, said predetermined number of intervals separating said pair of primary positions being identifiable by the expression $2^n$ and being less than the extent of at least one of said first and second ranges and wherein said first and second functions differ solely by an inverted logical response of inputs equal in analog component output to the predetermined number of intervals between said primary positions.

5. Mechanism as defined in claim 1 wherein the carrier comprises a base member, said data bearing means comprise individual character masters, and said operating station defining means comprises a platen for force cooperation with said character masters for printing images thereof on imaging media positioned therebetween.

6. Mechanism as defined in claim 1 wherein said predetermined ranges overlap to mutually encompass a number of intervals equal to the number of intervals separating said pair of primary positions.

References Cited

UNITED STATES PATENTS

| | | | |
|---|---|---|---|
| 2,919,002 | 12/1959 | Palmer | 197—16 |
| 2,978,086 | 4/1961 | Hickerson | 197—16 |
| 3,302,764 | 2/1967 | Hickerson | 197—16 |

EDGAR S. BURR, Primary Examiner

U.S. Cl. X.R.

178—34; 197—71